United States Patent [19]

Thompson et al.

[11] Patent Number: 5,016,861
[45] Date of Patent: May 21, 1991

[54] MOUNTING OF A SINGLE TRANSVERSE LEAF SPRING FOR VEHICLES

[75] Inventors: John E. Thompson; Angelo Gonzalez, both of St. Petersburg; Joseph S. Bursel, Sarasota; Hampton L. Aust, III, Treasure Island, all of Fla.

[73] Assignee: Vette Products, Inc., St. Petersburg, Fla.

[21] Appl. No.: 428,015

[22] Filed: Oct. 26, 1989

Related U.S. Application Data

[63] Continuation of Ser. No. 162,131, Feb. 29, 1988, abandoned.

[51] Int. Cl.$^5$ .............................................. F16F 1/26
[52] U.S. Cl. ........................................ 267/44; 267/52; 267/149; 267/160
[58] Field of Search ............... 267/36.1, 40, 44, 47, 267/41, 52, 148, 149, 158, 160, 193, 245, 229, 269, 271, 246, 242; 280/699, 719, 720

[56] References Cited

U.S. PATENT DOCUMENTS

| | | | |
|---|---|---|---|
| 1,336,481 | 4/1920 | Nettenstrom | 267/245 X |
| 1,383,723 | 7/1921 | Jones | 267/52 |
| 1,435,915 | 11/1922 | Cowey | 267/41 |
| 1,597,988 | 8/1926 | Lundelius | 267/52 |
| 2,621,920 | 12/1952 | Hogsten et al. | 267/52 X |
| 2,913,251 | 11/1959 | Herbenar | 267/269 X |
| 3,913,941 | 10/1975 | Guerriero et al. | 267/40 X |
| 4,458,918 | 7/1984 | Rumpel | 280/720 X |
| 4,557,500 | 12/1985 | Collard et al. | 267/246 X |
| 4,684,110 | 4/1987 | Sale et al. | 267/52 |
| 4,779,894 | 10/1988 | Cowburn | 267/52 X |
| 4,886,254 | 12/1989 | Carpentier et al. | 267/148 |

FOREIGN PATENT DOCUMENTS

| | | | |
|---|---|---|---|
| 937391 | 1/1956 | Fed. Rep. of Germany | 267/246 |
| 1028436 | 4/1968 | Fed. Rep. of Germany | 280/124 R |
| 22471 | 7/1921 | France | 267/36.1 |
| 1008358 | 5/1952 | France | 267/36.1 |
| 2520304 | 7/1983 | France | 280/719 |
| 8707564 | 12/1987 | World Int. Prop. O. | 267/31 |

*Primary Examiner*—George E. A. Halvosa
*Attorney, Agent, or Firm*—Fleit, Jacobson, Cohn, Price, Holman & Stern

[57] ABSTRACT

An upwardly bowed single transverse leaf spring is provided and includes longitudinally spaced central mounting areas between which a longitudinal mid-portion of the spring extends. The spring includes opposite end portions on remote sides of said mounting areas for anchoring relative to vehicle wheel supporting spindle structures and the mounting areas of the spring have mounts stationarily mounted relative thereto but adjustably positionable longitudinally of the spring and the mounts are pivotally mounted from the stationary mounting structures for oscillation about horizontal parallel axes extending transversely of the leaf spring with the pivotal mounting of the mounts from the stationary mounting structures being such that each axis of oscillation of a mount relative to the corresponding stationary mounting structure may be adjusted transversely of the corresponding vehicle.

13 Claims, 2 Drawing Sheets

MOUNTING OF A SINGLE TRANSVERSE LEAF SPRING FOR VEHICLES

This application is a continuation of application Ser. No. 162,131, filed Feb. 29, 1988, now abandoned.

BACKGROUND OF THE INVENTION

1. FIELD OF THE INVENTION

This invention relates to a single transverse leaf spring suspension for vehicles and incorporates a pair of elastomeric material cushioned mounts releasably clampingly engaged with longitudinally spaced mid-portions of the leaf spring for adjustable positioning therealong and with the mounts and stationary mounting structure supported from an associated vehicle including coacting structure oscillatably supporting the mounts from the mounting structure for angular displacement about generally parallel axes spaced a predetermined distance above the leaf spring and disposed transverse thereto. In addition, the coacting structure is also operative to enable selective adjustment of the mounts longitudinally of the leaf spring mid-portion and corresponding adjustment of the corresponding axes of oscillation longitudinally of the leaf spring and transversely of the associated vehicle.

2. Description of Related Art

Year model 1984 and later CORVETTE vehicles utilize single transverse leaf springs for spring suspending the front wheels thereof and longitudinally spaced mid-portions of these leaf springs are cushion mounted through the utilization of elastomeric material from corresponding transversely spaced frame portions of the associated vehicle for oscillation of the cushion mounted mid-portions about front-to-rear extending generally horizontal axes disposed at substantially the horizontal center line of the leaf spring cushion mounted mid-portions. Although this known cushion mounting of the leaf spring is reasonably effective, inasmuch as the leaf spring, when in a static non-flexed position, is upwardly bowed, upward displacement of the opposite end portions of the leaf spring flexes the latter partially toward a substantially straight horizontal condition, thus reducing the bow in the longitudinal center portion of the leaf spring extending between the cushion mounted mid-portions thereof and increasing the effective horizontal distance between those cushion mounted mid-portions. Accordingly, inasmuch as the structures by which the cushion mounted mid-portions of the spring are mounted from the associated vehicle frame portions are rigid with the latter, the increase in effective horizontal distance between the cushion mounted spring mid-portions causes the cushion mounted spring mid-portions to longitudinally shift relative to the mounting structure therefor. This movement of the longitudinally spaced mid-portions of the leaf spring relative to the mounting structures therefor places the elastomeric material utilized in cushion mounting the spring mid-portions to be placed in shear and such operating conditions appreciably reduce the responsiveness of the suspension system, increase ride harshness and reduce speed handling performance.

SUMMARY OF THE INVENTION

The leaf spring of the instant invention also utilizes cushion mounted longitudinally spaced mid-portions which are oscillatably supported from the corresponding vehicle frame portions, but the axes of oscillation of the spring mid-portions are spaced a predetermined distance above the leaf spring itself such that when the leaf spring is flexed toward a straightened condition and the longitudinal mid-portion of the spring extending between the cushion mounted mid-portions thereof increases in effective horizontal length, those portions of the mounts from which the longitudinally spaced mid-portions of the spring are cushion mounted swing away from each other so as to increase the horizontal spacing therebetween an amount substantially equal to the increase in horizontal length of the cushion mounted longitudinally spaced mid-portions of the spring.

The main object of this invention is to provide an improved elastomeric material mounting structure for longitudinally spaced mid-portions of a vehicle transverse leaf spring.

Another object of this invention is to provide mounting structure which will automatically compensate for increases and decreases in the effective horizontal length of a transverse leaf spring mid-portion between longitudinally spaced vehicle frame mounted portions thereof as the opposite ends of the leaf spring are flexed up and down.

Still another important object of this invention is to provide leaf spring mounting structure in accordance with the preceding objects and which may be readily shifted longitudinally of the corresponding leaf spring.

A further object with this invention, in accordance with the immediately preceding object, is to provide mounting structures which are oscillatably supported from vehicle frame portions for angular displacement about horizontal front-to-rear extending axes spaced a predetermined distance above the leaf spring and wherein the axes of oscillation may be adjusted transversely of the associated vehicle in accordance with adjustment of the mounting structures along the length of the leaf spring.

A final object of this invention to be specifically enumerated herein is to provide a single transverse leaf spring suspension for vehicles in accordance with the preceding objects and which will conform to conventional forms of manufacture, be of simple construction and easy to install and adjust so as to provide a device that will be economically feasible, long-lasting and relatively trouble free in installation and precision tuning.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENT

Figure 2:
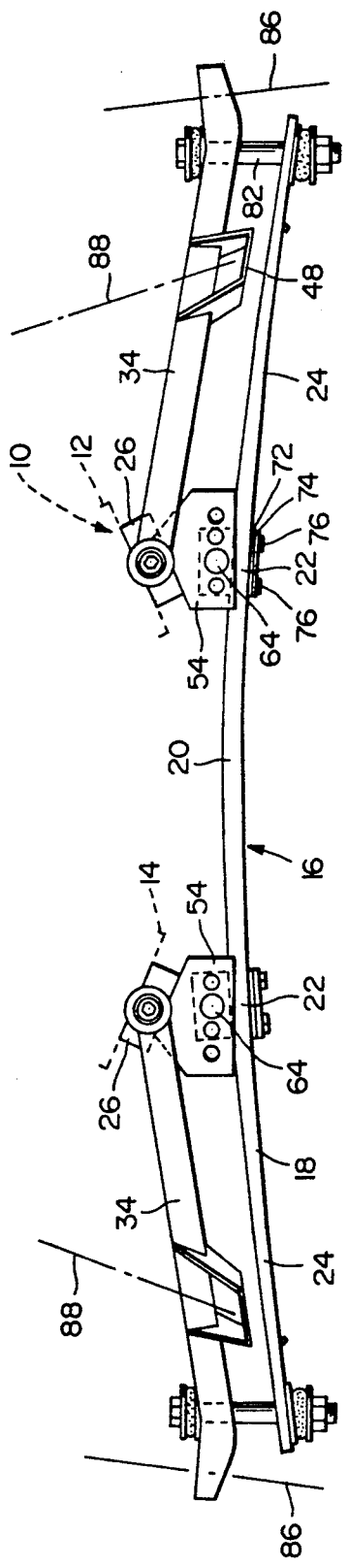
FIG. 2 is a front elevational view of the suspension system.
Figure 4:
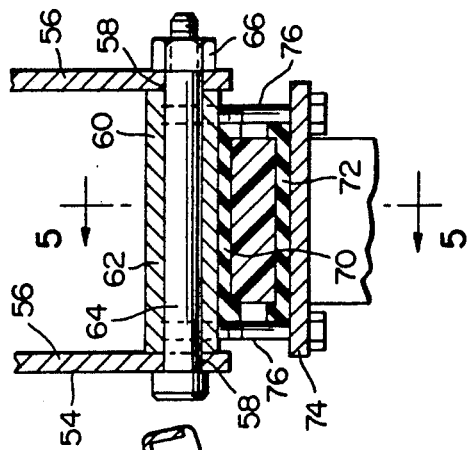
FIG. 4 is an enlarged fragmentary vertical sectional view taken substantially upon the plane indicated by the section line 4—4 of FIG. 3.

Referring now more specifically to the drawings, the numeral 10, in FIG. 2, generally designates (in phanthom lines) a vehicle including transversely spaced forward frame portions 12 and 14. The suspension assembly of the instant invention is referred to in general by the reference numeral 16 and includes an upwardly bowed generally horizontal transverse single leaf spring 18. The leaf spring 18 is constructed of fiberglass composite (other materials may be used) and includes a longitudinal mid-portion 20 extending between longitudinally spaced mid-portion mounting areas 22 and opposite end portions 24 extending from the mounting areas 22 toward the free terminal ends of the spring 18.

Figure 1:
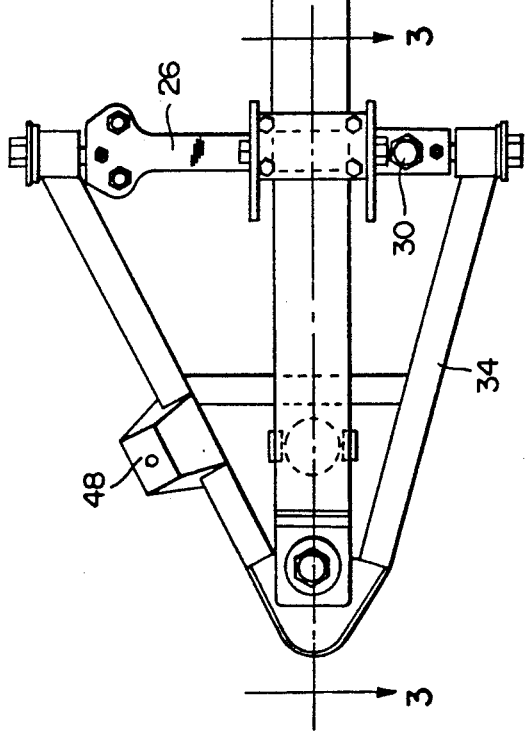
FIG. 1 is a bottom plan view of a suspension system constructed in accordance with the present invention.
Figure 6:
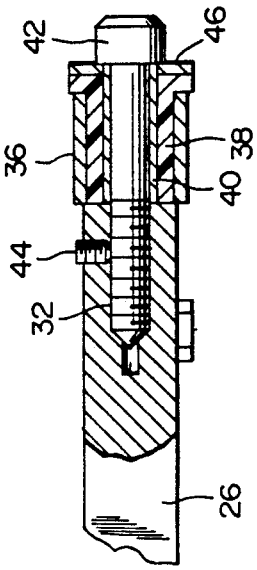
FIG. 6 is a fragmentary enlarged vertical sectional view taken substantially upon the plane indicated by the section line 6—6 of FIG. 1.
Figure 5:
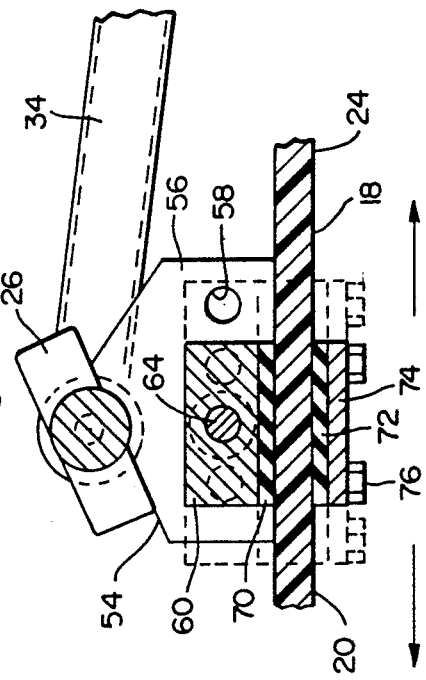
FIG. 5 is a fragmentary enlarged vertical sectional view similar to the left-hand portion of FIG. 3 but illustrating the leaf spring in a substantially straightened condition.

A pair of front-to-rear extending horizontally elongated mounting brackets 26 are secured to the frame portions 12 and 14 through the utilization of pairs of mounting bolts 28 securing the forward ends of the mounting brackets 26 to the frame portions 12 and 14 and single bolts 30 mounting the rear ends of the mounting brackets 26 to the frame portions 12 and 14. The opposite ends of the mounting brackets 26 include threaded blind bores 32 formed therein and the free ends of each of a pair of A-frame control arms 34 include aligned sleeves 36 in which polyurethane shouldered bushings 38 are disposed, the bushings 38 having steel sleeves 40 extending therethrough. Headed bolts 42 are passed through the sleeves 40 and the bushings at 38 and are threaded in the bores 32 and retained therein by set screws 44, washers 46 being provided between the heads of the bolts 42 and the bushings 38. In this manner, the inner ends of the control arms 34 are pivotally mounted from the frame portions 12 and 14. Although the mounting brackets 26 are illustrated in substantially parallel position in FIG. 1, the parallel relationship of the axes of oscillation of the control arms 34 is utilized only for clarity sake.

The outer end portions of the control arms 34 include sway bar mounting brackets 48 and also mounting lugs 50 on opposite sides of openings 52 for attaching the lower ends of shock absorbers to the control arm outer ends.

The longitudinal mid-portions of the mounting brackets 26, registered with the mounting areas 22, include depending mount portions 54 each defined by a pair of depending parallel mounting plates 56 having four pairs of registered front-to-rear extending bores 58 formed therethrough and spaced transversely of the vehicle 10. A mounting member 60 in the form of an aluminum block is disposed between each pair of plates 56 and has a bore 62 formed therethrough registrable with a selected pair of corresponding bores 58 and a shouldered bolt 64 and nut 66 are utilized to pivotally support each mounting member or aluminum block 60 between the corresponding pair of mounting plates 56.

The mounting areas 22 are each sandwiched between opposing upper and lower channel members 70 and 72 constructed of elastomeric material and a clamp plate 74 is disposed beneath each channel member 72 and secured to the corresponding mounting member 60 through the utilization of threaded bolts 76, the upper channel members 70 immediately underlying the corresponding mounting members 60. Accordingly, each of the mounting areas 22 is clampingly secured, in a cushioned manner, to the underside of the corresponding mounting member 60. It is to be noted, however, that before the fasteners or bolts 76 are tightened the bolt 64 may be removed and the bore 62 in the mounting member 60 may be registered with any pair of the four pairs of registered bores 58 formed in the mounting plates 56. Thus, the mounting areas 22 each may be adjusted independent of the other longitudinally of the leaf spring 18.

The opposite ends of the leaf spring 18 include openings 80 formed therethrough by which the lower ends of a pair of bolts 82 may be anchored to the leaf spring ends, the upper ends of the bolts 82 being cushioned and passing through openings 84 provided therefor in the outer ends of the control arms 34.

Any suitable structures (not shown) may be connected to the outer ends of the control arms 34 for supporting wheel journalling structure therefrom with such wheel journalling structure, if to support steerable wheels, having spindle center lines such as that designated at 86, the aforementioned shock absorbers (not shown) having center lines designated at 88, see FIG. 2.

Figure 3:
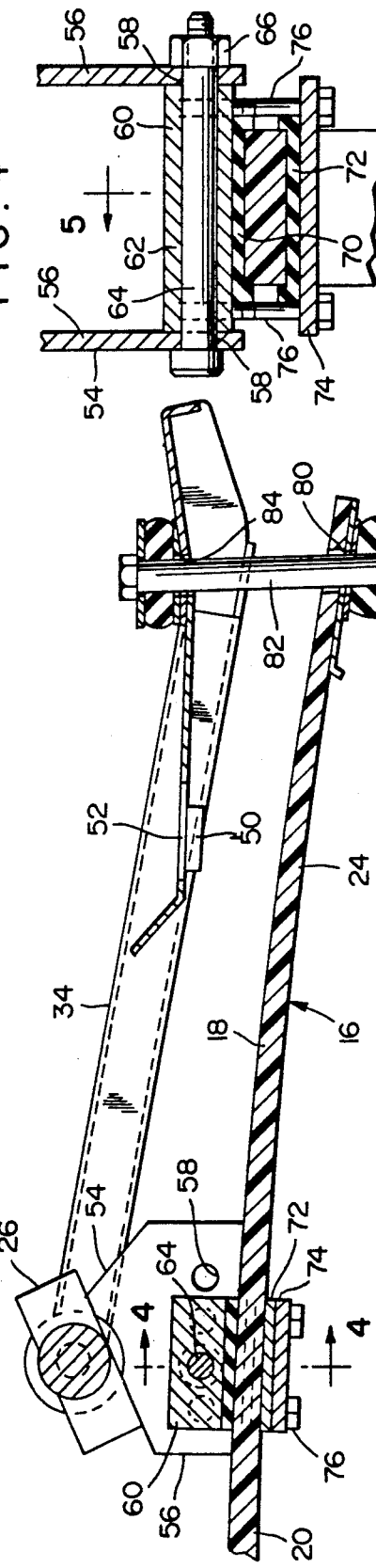
FIG. 3 is an enlarged fragmentary vertical sectional view taken substantially upon the plane indicated by the section line 3—3 of FIG. 1.

With attention invited now more specifically to FIGS. 2 and 3 of the drawings, it will be seen that the leaf spring 18 is upwardly centrally bowed even when the mount portions 54 are downwardly loaded with the weight of the front of the vehicle 10 thereon.

If the downward loading on the mount portions 54 is increased due to sudden deceleration or the vehicle 10 encountering a bump in an associated roadway, the outer ends of the control arms 34 swing upwardly relative to the frame portions 12 and 14 and the leaf spring 18 is flexed partially toward a straightened condition. When this occurs, the longitudinal mid-portion 20 of the leaf spring 18 is straightened and the effective horizontal distance between the mounting areas 22 is increased. However, inasmuch as the pivot axes defined by the bolts 64 for the mounting members 60 are spaced above the leaf spring mounting areas 22, as the longitudinal mid-portion 20 of the leaf spring 18 is flexed partially toward a straightened condition the pairs of opposing channel members between which the mounting areas 22 of the leaf spring 18 are clamped swing away from each other about the bolts 64 an amount substantially equal to the effective increase in the horizontal distance between the mounting areas 22. Therefore, the suspended and cushioned mounting of the mounting areas 22 beneath the blocks 60 automatically compensates for increases in the effective horizontal distance between the mounting areas 22 of the spring 18 as the spring 18 is flexed from the bowed condition thereof illustrated in FIG. 2 partially toward a straightened condition.

As a result of this unique mounting of the mounting areas 22 of the leaf spring 18, the elastomeric material channel members 70 and 72 are not placed in shear as would be the case if the effective axes of oscillation of the blocks or mounting members 60 were closer to, on or below the center line of the spring. For this reason, rapid flexure of the fiberglass leaf spring is not restricted and the suspension assembly 16 is more responsive to uneven road surfaces.

If it is desired to provide a smoother or "boulevard" ride, the bolts 64 may be removed, the bolts 76 may be loosened and the mounting members or blocks 60 may be shifted slightly inboard so that the bolts 64 may be passed through the inboardmost bores 58. On the other hand, if the vehicle 10 is to be utilized on rougher road surfaces or it is desired to obtain maximum suspension assembly stiffness for high speed handling purposes the bolts 64 may be shifted to the outboardmost bores 58 along with corresponding outward shifting of the mounting members or blocks 60 along the spring end portions. Still further, if the vehicle 10 is to be utilized on a race course which incorporates high banked turns which occur in one direction more than the other direction, the bolt 64 on the outside of such a turn may be disposed more outboard with regard to the center line of the vehicle 10 than the bolt 64 on the inside of the turn.

In view of the above, it will be noted that an extremely simple suspension assembly is provided which may be used either on the front of a vehicle or the rear of a vehicle and which is highly responsive. Further, the suspension assembly 16 may be adjusted according to the type of suspension desired and asymmetrically if a race course over which the vehicle 10 is to be raced warrants different suspension adjustment on opposite sides of the vehicle 10.

The foregoing is considered as illustrative only of the principles of the invention. Further since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. In combination, a vehicle incorporating a suspension system including opposite vehicle side ground wheel portions mounted for up and down guided movement and stationary central frame portions horizontally spaced apart and between said wheel mounting portions, an elongated, generally horizontal and transverse vehicle mono-leaf spring disposed transverse to the longitudinal axis of said vehicle including an upwardly bowed static condition, with the weight of the vehicle thereon, and having a pair of longitudinally spaced central mounting areas for mounting from said vehicle frame portions and opposite end portions for mounting relative to said opposite vehicle side ground wheel mounting portions, a pair of stationary mount portions mounted from said frame portions, a pair of mounting members, pivot means mounting said mounting members from said mount portions for pivotal oscillation relative thereto about generally horizontal parallel axes disposed transverse to said spring, said mounting members including mounting means releasably mounting said leaf spring central mounting areas for substantial stationary support of said mounting areas relative to said mounting means, said central mounting areas being spaced predetermined distances beneath said parallel axes, such that upward displacement of said opposite end portions of said spring due to downward loading on said spring central mounting areas by said mount portions and the resultant flexure of the longitudinal central zone of said spring extending between said central mounting areas toward a straightened condition and the attendant increase in the effective horizontal spacing between said central mounting areas will automatically be compensated for by angular displacement of said mounting members in opposite directions about said parallel axes to increase the effective horizontal spacing between said mounting means and eliminate substantially all shear forces, due to flexing of said leaf spring, acting upon said mounting means, said leaf spring, between said mounting areas, being free of contact and connection with portions of said vehicle.

2. The combination of claim 1 wherein said pivot means, mounting members and mounting means include means operative to correspondingly adjustably vary the horizontal spacing between said parallel axes and the horizontal spacing between said mounting areas.

3. The combination of claim 1 wherein said mounting means includes releasable clamp means mounted from said mounting members releasably clamp engaged with said mounting areas.

4. The combination of claim 3 wherein said clamp means includes opposing elastomeric panels between which said mounting areas are clamped.

5. The combination of claim 4 wherein said elastomeric panels define opposing parallel channels extending along said leaf spring and in which said mounting areas are seated.

6. The combination of claim 1 wherein said leaf spring is constructed of fiberglass composite.

7. In combination with a pair of stationary mount portions supported from vehicle frame portions spaced apart transversely of the longitudinal axis of the associated vehicle, an elongated, generally horizontal transverse single leaf spring including an upwardly bowed static condition, with the weight of the vehicle thereon, and having longitudinally spaced central mounting areas, a longitudinal mid-portion extending between said mounting areas and opposite end portions disposed on remote sides of said mounting areas, said end portions including means for connection with vertically movable opposite vehicle side wheel spindle mounting portions, and mounting structures mounted from said mounting areas and pivotally mounted from said stationary mount portions for pivotal oscillation about generally horizontal parallel axes extending transversely of said leaf spring and spaced predetermined distances above said mounting areas such that upward displacement of said opposite end portions of said spring due to downward loading on said spring central portion mounting areas by said mount portions and the resultant flexure of said longitudinal mid-portion toward a straightened condition and the attendant increase in the effective horizontal spacing between said central mounting areas will automatically be compensated for by angular displacement of said mounting structures in opposite directions about said parallel axes to increase the effective horizontal spacing between said mounting structures and eliminate substantially all shear forces, due to flexing of said leaf spring, between said mounting structures and mounting areas, said leaf spring, between said mounting areas, being free of contact and connection with portions of said vehicle.

8. The structure of claim 7 wherein said mounting structures includes means for mounting relative to said mounting areas in shifted positions relative thereto longitudinally of said leaf spring, said mounting structures and stationary mount portions including means for adjustably varying the horizontal spacing between said parallel axes.

9. The structure of claim 7 wherein said mounting structures are vibration cushion mounted from said mounting areas.

10. In combination with a vehicle including mounting structures spaced apart transversely of the longitudinal axis of said vehicle, an elongated, horizontal transverse single leaf spring including an upwardly bowed static condition, with the weight of the vehicle thereon, and having longitudinally spaced central mounting areas, a longitudinal mid-portion extending between said mounting areas and opposite end portions disposed on remote sides of said mounting areas, a pair of mounts stationarily mounted from said mounting areas for independent adjustable shifting relative thereto longitudinally of said leaf spring, said mounts and mounting structures including coacting means pivotally mounting said mounts from said mounting structures for pivotal oscillation about parallel horizontal axes generally paralleling said longitudinal axis and spaced predetermined distances above said mounting areas such that upward displacement of said opposite end portions of said spring due to downward loading on said longitudinal mid-portion mounting areas and the resultant flexure of said longitudinal mid-portion toward a straightened condition and the attendant increase in the effective horizontal spacing between said central mounting areas will automatically be compensated for by angular displacement of said mounts in opposite directions about said parallel axes to increase the effective horizontal spacing between said mounts and eliminate substantially all shear forces, due to flexing of said leaf spring, between said mounting structures and said mounting areas, said end portions of said spring including means for attachment to vehicle opposite side wheel spindle support structures mounted from said vehicle for vertical shifting relative thereto, said leaf spring, between said mounting areas, being free of contact and connection with portions of said vehicle.

11. The vehicle of claim 10 wherein said coacting means includes means for independently laterally adjusting each of said parallel axes transversely of said vehicle to thereby adjust spring rate.

12. The vehicle of claim 11 wherein said leaf spring is constructed of fiberglass composite.

13. The vehicle of claim 10 wherein said leaf spring is of mono-leaf construction.

* * * * *